US008679701B2

(12) United States Patent
Sutherland et al.

(10) Patent No.: US 8,679,701 B2
(45) Date of Patent: Mar. 25, 2014

(54) FUEL CELLS

(75) Inventors: Hugh Liam Sutherland, Aldershot (GB); Alex Sean Blake, West Sussex (GB); John Sansum, Cranleigh (GB); Gene Stacey Lewis, London (GB)

(73) Assignee: AFC Energy plc (GB)

( * ) Notice: Subject to any disclaimer, the term of this patent is extended or adjusted under 35 U.S.C. 154(b) by 0 days.

(21) Appl. No.: 13/389,429

(22) PCT Filed: Jul. 21, 2010

(86) PCT No.: PCT/GB2010/051203
§ 371 (c)(1),
(2), (4) Date: Apr. 22, 2012

(87) PCT Pub. No.: WO2011/015842
PCT Pub. Date: Feb. 10, 2011

(65) Prior Publication Data
US 2012/0219880 A1    Aug. 30, 2012

(30) Foreign Application Priority Data
Aug. 7, 2009    (GB) .................................. 0913836.3

(51) Int. Cl.
*H01M 4/86* (2006.01)
*H01M 8/02* (2006.01)
*H01M 4/90* (2006.01)
*H01M 8/08* (2006.01)
*H01M 4/92* (2006.01)

(52) U.S. Cl.
CPC .. *H01M 8/08* (2013.01); *H01M 4/92* (2013.01)
USPC ....................................................... 429/498

(58) Field of Classification Search
None
See application file for complete search history.

(56) References Cited

U.S. PATENT DOCUMENTS

| | | | | |
|---|---|---|---|---|
| 3,215,562 | A | * | 11/1965 | Gerald ........................... 429/499 |
| 4,294,893 | A | * | 10/1981 | Iemmi et al. ................... 429/510 |
| 4,407,907 | A | * | 10/1983 | Takamura et al. ............. 429/505 |
| 4,591,538 | A | * | 5/1986 | Kunz .............................. 429/464 |
| 6,602,630 | B1 | * | 8/2003 | Gopal ............................ 429/483 |
| 6,743,536 | B2 | * | 6/2004 | Fuglevand ........................ 429/9 |
| 6,919,141 | B2 | * | 7/2005 | Gan et al. ....................... 429/203 |
| 7,553,517 | B1 | * | 6/2009 | Jablonski et al. .............. 427/252 |
| 2006/0286432 | A1 | | 12/2006 | Rakowski et al. |
| 2006/0286433 | A1 | * | 12/2006 | Rakowski et al. .............. 429/38 |
| 2008/0066298 | A1 | * | 3/2008 | Lin et al. ...................... 29/623.1 |

OTHER PUBLICATIONS http://www.tmfiltration.com/TechInfo/MeshMicronConversion.php.*
PCT International Search Report and Written Opinion for PCT Application No. PCT/GB2010/051203 dated Nov. 5, 2010.

* cited by examiner

*Primary Examiner* — Patrick Ryan
*Assistant Examiner* — Christopher Domone
(74) *Attorney, Agent, or Firm* — Tumey L.L.P.

(57) ABSTRACT

A liquid electrolyte fuel cell comprises means to define an electrolyte chamber, and electrodes on opposite sides of the electrolyte chamber. The electrode comprises an electrically conductive sheet (10) through which are defined a multiplicity of through-pores or holes (14). These may be formed by laser drilling through the sheet. The electrode would normally also include a layer (16) of catalytic material. The margin (15) of the sheet is not perforated or porous, to simplify sealing.

8 Claims, 1 Drawing Sheet

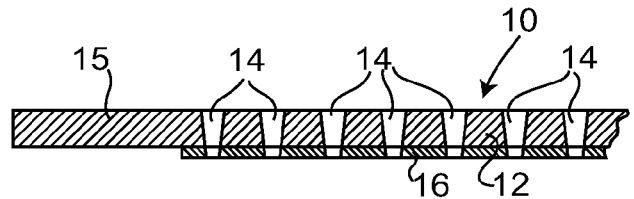
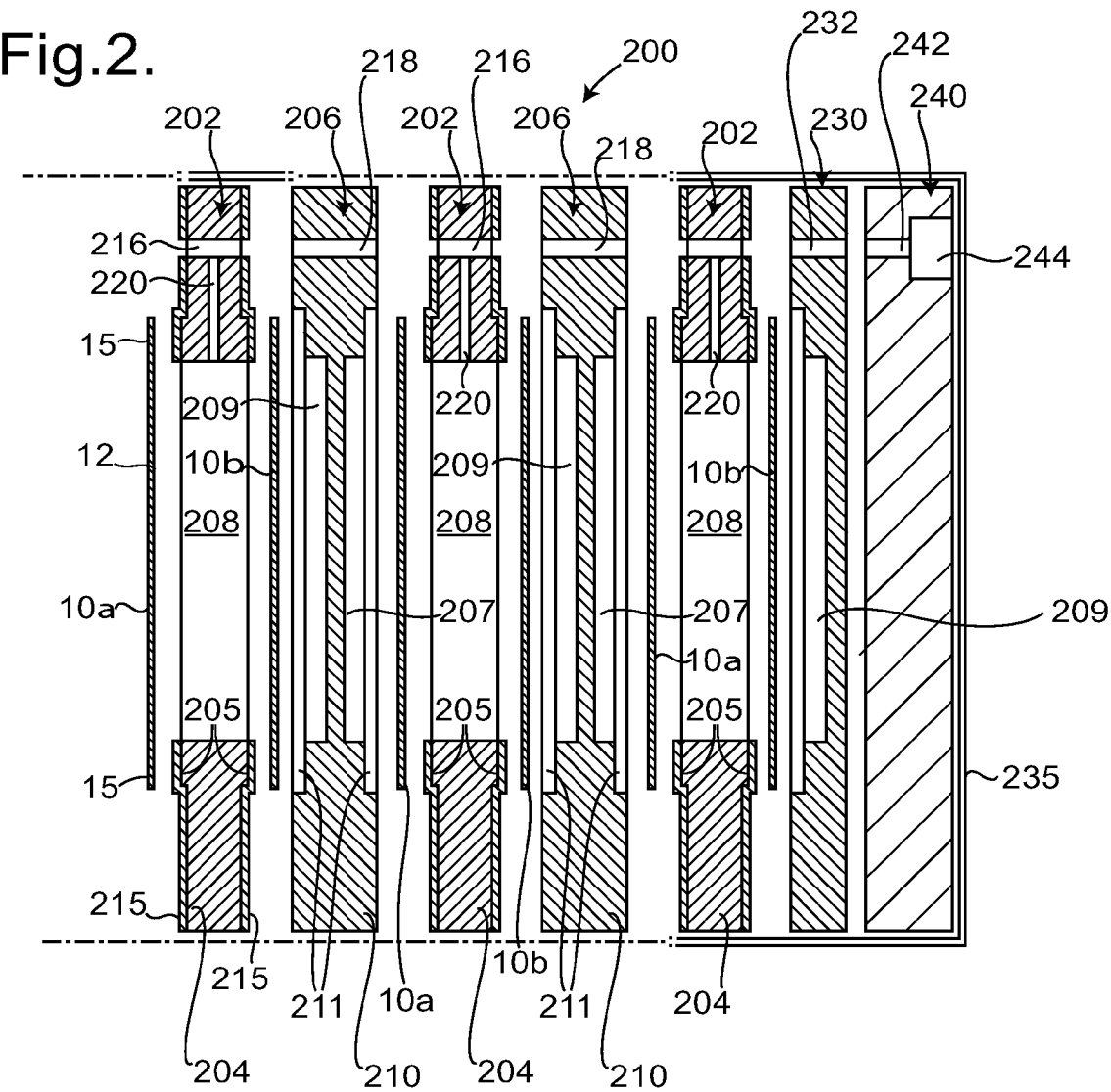
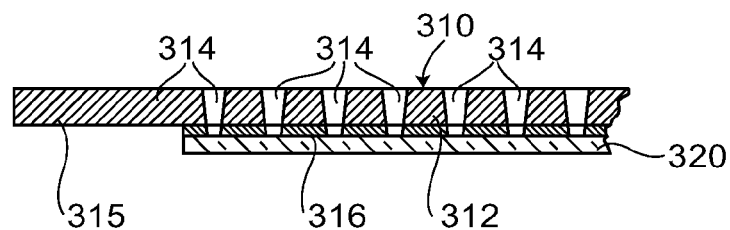

FUEL CELLS

The present invention relates to liquid electrolyte fuel cells, preferably but not exclusively alkaline fuel cells, and to electrodes suitable for such fuel cells.

BACKGROUND TO THE INVENTION

Fuel cells have been identified as a relatively clean and efficient source of electrical power. Alkaline fuel cells are of particular interest because they operate at relatively low temperatures, are efficient and mechanically and electrochemically durable. Acid fuel cells and fuel cells employing other aqueous electrolytes are also of interest. Such fuel cells typically comprise an electrolyte chamber separated from a fuel gas chamber (containing a fuel gas, typically hydrogen) and a further gas chamber (containing an oxidant gas, usually air). The electrolyte chamber is separated from the gas chambers using electrodes. Typical electrodes for alkaline fuel cells comprise a conductive metal mesh, typically nickel, that provides mechanical strength to the electrode. Onto the metal mesh is deposited a catalyst as a slurry or dispersion of particulate poly tetra-fluoroethylene (PTFE), activated carbon and a catalyst metal, typically platinum. Such electrodes are expensive, electrically inefficient, and suffer from irregular distribution of catalyst. Furthermore, the nickel mesh is prone to breakage and causes local irregularities and unwanted variations in electric field due to resistance at the contact points between the wires of the mesh.

A further problem with such electrodes is that it is necessary to provide a seal around a periphery of the electrode to prevent leakage of gas from the adjacent gas chamber, and this is inherently difficult with a mesh structure.

DISCUSSION OF THE INVENTION

The electrode of the present invention addresses or mitigates one or more problems of the prior art.

Accordingly the present invention, in a first aspect, provides a liquid electrolyte fuel cell with means to define an electrolyte chamber, and comprising two electrodes, one electrode on either side of the electrolyte chamber, each electrode comprising a sheet of electrically conducting material through which are defined a multiplicity of through-pores, the sheet having a peripheral margin without through-pores, the electrodes being removable from the electrolyte-chamber-defining means.

The electrode must also comprise a catalyst to enable the chemical reaction with the gas phase to occur. In some cases the surface of the electrically-conducting material may be sufficiently catalytic for this purpose, but more usually the electrode also incorporates a coating of catalytic material. The through-pores ensure that the electrode is permeable so as to enable intimate contact between the liquid electrolyte, the catalytic material and the gas phase, with a gas/liquid interface in contact with the catalytic material. The catalytic material may be provided on a particulate support material.

The electrically-conducting material is preferably a metal, although an electrically-conducting polymer material may also be suitable. Preferably the electrically conductive material will have a room temperature value of resistivity in the range between $1.5 \times 10^{-8}$ ohm m and $5 \times 10^{-4}$ ohm m, and more referable between $5 \times 10^{-8}$ ohm m and $1 \times 10^{-6}$ ohm m.

Preferably the through-pores are defined by etched or drilled holes, so there are discrete holes. Alternatively it may be possible to form the metal sheet by electro-forming, or even by sintering, although the latter process is difficult to use when making thin sheets and forms a three-dimensional connected network of pores rather than discrete holes. The preferred structure is formed by laser drilling. The thickness of the electrically-conducting sheet may be between 0.1 mm and 3 mm, more preferably between 0.2 mm and 0.4 mm, for example 0.3 mm (300 μm) or 0.25 mm (250 μm); and the holes may be of width or diameter between 5 μm and 500 μm, preferably less than 50 μm, for example about 20 μm or 30 μm, and spaced between 50 μm and 10 mm apart. Such holes may be created by laser drilling. In some cases the diameter of the hole gradually decreases through the thickness of the sheet, so the holes are slightly tapered. In cross-section, the holes may for example be circular, oval or elliptical. The holes may also be formed by an etching process.

The provision of a non-porous edge region around the perimeter of the electrode simplifies sealing to adjacent components of the fuel cell. As compared to a metal mesh it will be appreciated that the electrically-conducting sheet of the present invention provides better electrical conduction, as no wire-to-wire contacts are involved; it also provides a more uniform distribution of current; and the structure is stiffer for equal values of porosity, as there are no crossing-over wires that can move relative to each other. The size, shape and surface of the pores or holes may assist in controlling the position of the electrolyte/gas phase interface, using capillary forces. The size and spacing of the holes is also selected to ensure satisfactory diffusion of the reactant species (gas or liquid) to and from that interface.

The electrode of the invention preferably has a bubble point between 20 mbar and 100 mbar, for example about 40 mbar.

The metal of the metal sheet may be nickel, or may be stainless-steel; other metals that are not significantly affected by the electrolyte may also be used. In some cases it may be preferable to use a metal such as silver, gold or titanium, either to form the sheet or to provide a coating on the sheet. If the metal is a steel that contains both chromium and manganese, heat treatment of the steel may generate a chromium manganese oxide spinel coating on the surface, which is itself electrically conductive and protective to the underlying metal. Similar protective coatings may be formed on an electrode of other metals, or may be formed using known deposition techniques such as electrodeposition. The provision of a protective coating on the surface may enhance the chemical durability of the metal sheet; where no such protective layer is present, the durability of the metal sheet would be decreased. The preferred material is nickel, as this is resistant to corrosion in contact with an alkaline electrolyte for example of potassium hydroxide solution.

In a second aspect, the present invention provides an electrode comprising a sheet of electrically conducting material through which are defined a multiplicity of discrete through-holes, and a peripheral margin without through-holes; a layer of particulate catalyst material on a surface of the electrically-conducting sheet; and a layer of permeable polymeric material covering the layer of particulate catalyst material.

Such an electrode may also be incorporated into a fuel cell. If the polymeric material is hydrophilic the electrically-conducting layer is preferably at the side of the electrode further from the electrolyte, whereas if the polymeric material is hydrophobic the electrically-conducting layer would preferably be at the side in contact with the electrolyte.

The invention will now be further and more particularly described, by way of example only, and with reference to the accompanying drawings in which:

FIG. 1 shows a cross-sectional view through an electrode;

FIG. 2 shows a cross-sectional view of a fuel cell stack incorporating electrodes as shown in FIG. 1; and FIG. 3 shows a cross-sectional view of an alternative electrode.

Referring to FIG. 1, an electrode 10 comprises a sheet of ferritic stainless-steel. The sheet is of thickness 0.3 mm. Most of the sheet—the central region 12—is perforated by laser drilling to produce a very large number of through holes 14, the holes each being of mean diameter 30 µm and being separated by between 100-150 µm; as a result of the laser drilling process, each hole 14 is in practice slightly tapered along its length. A margin 15 around the periphery of the sheet 10, of width 5 mm, is not perforated. (The hole dimensions and separations are given here by way of example, and in an alternative the holes might be of mean diameter 100 µm and separated by between 50 and 100 µm.)

After forming the through holes 14, the sheet 10 is subjected to a heat treatment in which it is held at a temperature between 650 and 850° C. in air (an oxygen-containing gas) for between 30 minutes and 2 hours, so as to form a protective surface coating of conductive chromium manganese oxide spinel. One surface of the perforated central region 12 is then covered in a coating 16 of a catalyst mixture. The electrode 10 may be used in either a cathode or an anode; the only difference would be in the composition of the catalyst mixture, and indeed some catalyst compositions may be suitable in both anodes and cathodes. At least some of the catalyst mixture may be within the holes 14.

By way of example, catalyst mixtures for both cathode and anode electrodes may use a combination of catalyst, binder and solvent which is spray-coated onto the surface of the sheet 10. The binder may for example be a polyolefin (such as polyethylene) which been made tacky by heat treatment with a liquid such as a hydrocarbon (typically between C6 and C12), the liquid then acting as a dispersing agent for the catalyst particles and for the binder, and evaporating after the coating step. Percentage weights refer to the total mass of the dry materials. Some example compositions are as follows:

The cathode catalyst mixtures A to C below include an oxygen reduction catalyst.

A. Activated carbon, with 10% binder.
B. 10% Pd/Pt on activated carbon, with 10% binder.
C. Silver on activated carbon, with 10% binder.

The anode catalyst mixtures D and E below include a hydrogen oxidation catalyst.

D. Leached nickel-aluminum alloy powder with activated carbon, with 10% binder.
E. 10% Pd/Pt on activated carbon, with 10% binder.

Referring now to FIG. 2, there is shown a cross-sectional view through the structural components of a cell stack 200 with the components separated for clarity. The stack 200 consists of a stack of moulded plastic plates 202 and 206 arranged alternately. The plates 202 define a generally rectangular through-aperture 208 surrounded by a frame 204; the apertures 208 provide electrolyte chambers; immediately surrounding the aperture 208 is a 5 mm wide portion 205 of the frame which projects 0.5 mm above the surface of the remaining part of the frame 204. The plates 206 are bipolar plates; they define rectangular blind recesses 207 and 209 on opposite faces, each recess being about 3 mm deep, surrounded by a frame 210 generally similar to the frame 204, but in which there is a 5 mm wide shallow recess 211 of depth 1.0 mm surrounding each recess. The blind recesses 207 and 209 provide gas chambers.

It will thus be appreciated that between one bipolar plate 206 and the next in the stack 200 (or between the last bipolar plate 206 and an end plate 230), there is an electrolyte chamber 208, with an anode 10a on one side and a cathode 10b on the opposite side; and there are gas chambers 207 and 209 at the opposite faces of the anode 10a and the cathode 10b respectively. These components constitute a single fuel cell.

Electrodes 10a and 10b locate in the shallow recesses 211 on opposite sides of each bipolar plate 206, with the catalyst-carrying face of the electrode 10a or 10b facing the respective blind recess 207 or 209 respectively. Before assembly of the stack components, the opposed surfaces of each frame 204 (including that of the raised portion 205) is covered with gasket sealant 215; this adheres to the frame 204 and dries to give a non-tacky outer surface, while remaining resilient. The components are then assembled as described, so that the raised portions 205 locate in the shallow recesses 211, securing the electrodes 10a and 10b in place. The sealant 215 ensures that electrolyte in the chambers 208 cannot leak out, and that gases cannot leak in, around the edges of the electrodes 10a and 10b, and also ensures that gases cannot leak out between adjacent frames 204 and 210. The perforated central section 12 of each electrode plate 10 corresponds to the area of the electrolyte chamber 208 and of the gas chamber 207 or 209; the non-perforated peripheral margin 15 is sealed into the peripheral shallow recess 211; and the catalyst coating 16 is on the face of the electrode plate 10 closest to the adjacent gas chamber 207 or 209.

In a modification of the fuel cell stack 200, the shallow recesses 211 are of depth substantially equal to the thickness of the electrodes 10; in this case the raised portion 205 is omitted from the plates 202, so that the frame 204 in that region is of uniform thickness. The plates 202 may again be covered with gasket sealant 215 on their opposed surfaces. Alternatively a flexible and elastomeric gasket material may be over-moulded onto both faces of the plates 202, also being moulded onto the edge of the plate 202 around the electrolyte-chamber 208.

The surfaces of the frames 210 of the bipolar plates 206, including the outer edge surface, may be provided with a nickel coating, for example by electro-less deposition. This coating of nickel provides an electrical connection between an anode 10a on one side and a cathode 10b on the other side, so that the fuel cells of the stack are connected in series with each other. This coating may alternatively be of other conducting materials. Electrical connection between the successive electrodes in the stack may instead be achieved in alternative ways. For example each electrode may have one or more projections that extend beyond the edge of the adjacent frames 210, so that electrodes 10a and 10b on opposite sides of a bipolar plate 206 can be connected by external connectors.

The flow of electrolyte to and from the electrolyte chambers (apertures 208), and the flows of the gases to and from the gas chambers (recesses 207 and 209), follow respective fluid flow ducts defined by aligned apertures through the plates 202 and 206; only one such set of apertures 216 and 218 are shown. This set of apertures 216 and 218 provides electrolyte to the electrolyte chambers 208 via narrow transverse ducts 220. The sealant 215 is placed so as not to block the apertures 216. At one end of the stack 200 is a polar plate 230 which defines a blind recess 209 on one face but is blank on the outer face. Outside this is an end plate 240, which also is moulded of polymeric material, and which defines apertures 242 which align with the apertures 216 and 218 in the plates 202 and 206; at the outside face the end plate 240 also defines ports 244 communicating with the apertures and so with the fluid flow ducts through which the gases and electrolyte flow to or from the stack 200, each port 244 comprising a cylindrical recess on the outer face. At the other end of the stack 200 is another polar plate (not shown) which defines a blind recess 207. There is then another end plate (not shown) which may be blank on the outer face and not define through apertures; alternatively it may define through apertures for one or more of oxidant gas, fuel gas and electrolyte.

After assembly of the stack 200 the components may be secured together for example using a strap 235 (shown partly broken away) around the entire stack 200. Other means may also be used for securing the components, such as bolts.

It will be appreciated that the cell stack 200 is given by way of example, and it may be modified. For example a modified electrode, as shown in FIG. 3, might instead be used in the fuel stack 200. Referring to FIG. 3, the electrode 300 comprises a sheet 310 of ferritic stainless-steel. The sheet 310 is of thickness 0.2 mm. A central region 312 of the sheet is perforated by laser drilling to produce a very large number of through-holes 314, each hole being of diameter 25 µm, and the average separation being 150 µm. A margin 315 around the periphery of the sheet 310, of width 6 mm, is not perforated. One surface of the perforated region 312 is covered with a layer 316 of particulate catalyst material with a binder.

The layer of catalyst 316 is covered with a microporous sheet 320 of polypropylene plastics material (SciMAT 700/70™), which is hydrophilic and has an approximate thickness of between 25 and 400 µm, such as 125 µm, and a bubble point of between 8.0 to 15.0 kPa gauge. This material has a wicking rate of 90 mm per 600 seconds. A range of different nonwoven polymeric materials are suitable for this purpose; for example various polyolefin plastics materials (e.g. Tyvek™, from DuPont) may be rendered hydrophilic by treatment with a concentrated acid, such as sulfuric or acrylic acid. The microporous sheet is preferably placed over the catalyst layer 316 immediately after depositing the catalyst layer 316, while the binder is still wet, so that the catalyst layer 316 becomes sandwiched between the perforated portion 312 of the metal sheet and the hydrophilic microporous sheet 320, all of which are bonded together. The electrode 300 may be installed in the opposite orientation to that described in relation to FIG. 2, so the polymer microporous sheet 320 is that closest to the electrolyte, while the perforated portion 312 is adjacent to the gas chamber. This can provide improved management of the electrolyte flow towards, and flow of water away from, the three-phase interface between electrolyte, gas and catalyst. This may enable the thickness of the electrolyte chamber defining plate 202 to be decreased. The polymer sheet 320 may also enhance the gas management at the electrode.

The electrodes 10 and 300 described above each comprise a sheet of ferritic stainless-steel, with holes 14 or 314 formed by laser drilling. In a modification, the stainless steel is coated with a thin layer of nickel; this may be done before or after laser drilling holes through the stainless-steel sheet. The nickel is a good electrical conductor, and also protects the stainless steel against corrosion from the electrolyte.

In use of an electrode of the invention, electrolyte is present at one face and gas is present at the other face, such that there is a gas/liquid interface in the vicinity of the catalyst. The gas does not bubble through the electrode into the electrolyte, as the interface is at a substantially constant position.

The invention claimed is:

1. A liquid electrolyte fuel cell with means to define an electrolyte chamber, and comprising two electrodes, one electrode on either side of the electrolyte chamber, each electrode comprising a sheet of electrically conducting metal through which are defined a multiplicity of through-pores, the sheet having a peripheral margin without through-pores, each electrode also comprising a coating of catalytic material to define a catalyst-carrying face of the electrode, the coating including carbon and a binder, coated on one surface of the metal sheet, such that in use of the cell, liquid electrolyte is present at one face of the electrode and gas is present at the other face of the electrode, such that there is an interface between gas and liquid electrolyte at a substantially constant position in the vicinity of the catalyst, and wherein the electrodes are removable from the electrolyte-chamber-defining means.

2. A fuel cell as claimed in claim 1 also comprising a porous sheet of hydrophilic polymeric material covering and bonded to the catalytic surface.

3. A fuel cell as claimed in claim 1 wherein the through-pores are defined by etched or drilled holes.

4. A fuel cell as claimed in claim 3 wherein the metal sheet is of thickness between 0.1 mm and 3 mm, and wherein the holes are of width between 5 µm and 500 µm.

5. A fuel cell as claimed in claim 1 wherein the metal is nickel or stainless steel.

6. A fuel cell as claimed in claim 1 wherein the surface of the metal sheet is provided with a protective and electrically conducting coating.

7. A fuel cell as claimed in claim 5 wherein the metal sheet is of a ferritic stainless steel containing both chromium and manganese, the stainless steel having a surface of chromium manganese oxide spinel.

8. A fuel cell stack comprising a plurality of fuel cells as claimed in claim 1.

* * * * *